July 14, 1964  W. G. LOTT  3,140,846
AIRCRAFT COVERING COMPOSITION AND METHOD OF MAKING SAME
Filed April 14, 1958

INVENTOR.
WILLIAM G. LOTT
BY Elliott & Pastoriza
ATTORNEYS

United States Patent Office
3,140,846
Patented July 14, 1964

3,140,846
AIRCRAFT COVERING COMPOSITION AND METHOD OF MAKING SAME
William G. Lott, Santa Monica, Calif., assignor to Eonair, Inc., a corporation of California
Filed Apr. 14, 1958, Ser. No. 728,255
4 Claims. (Cl. 244—133)

This invention relates to improved compositions and to methods of fabricating and forming such compositions on frame structures to provide durable coverings.

The present improved covering composition and method have wide application and generally can be employed in any instance where it is desired to cover a structural frame such as a boat or aircraft with a weather-tight covering. In addition, the composition itself may be employed for a variety of different uses in which it is desired to provide a smooth surface covering, as for example, in outdoor motion picture screens. The preferred use for the composition and method, however, is in covering aircraft frames and for purposes of the present specification, the invention will be described in connection with this operation.

It is a primary object of the present invention, accordingly, to provide an improved composition for covering structural frame portions particularly aircraft fuselages and control surfaces, which is superior to conventional fabric coverings presently available.

More particularly, it is an object to provide an improved covering which will last appreciably longer than conventional coverings to the end that aircraft need not be recovered but require only a single initial covering which will last substantially for the entire lifetime of the aircraft.

Other objects of the invention are to provide an improved covering composition which is up to twice as strong in tensile strength, is approximately ten percent lighter, and which is more fire and tear resistant than present day fabric compositions.

Still another important object is to provide an improved covering composition meeting the foregoing objects which is competitive in price with present fabric coverings insofar as cost of materials is concerned.

Another object is to provide an improved method of forming and applying a covering which enables structural frames to be covered in approximately one-half the labor time presently required to cover similar structural frames with conventional fabric to the end that a considerable economic savings in time and labor results.

These and many other objects and advantages of the present invention are attained by forming the improved covering composition from a combination of a synthetic fiber material woven into a sheet or layer, and suitably shrunk, with glass fibers overlying the synthetic fiber layer. A resin adhesive thoroughly impregnates the sheet and glass fibers to bond the sheet and fibers together into an extremely strong and wear resistant composite covering. In accordance with the method, the initial sheets of synthetic woven fibers are preliminarily sewn together into a desired shape to receive a structural portion and are then heated to cause the referred to shrinkage thereby insuring an extremely taut and smooth surface. The glass fibers and resin adhesive may then be applied.

In the particular application of covering aircraft suitable reinforcing tapes may be employed at portions in direct engagement with structural components and wire stitching used in a conventional manner to secure the layer and glass fiber structure to the frame portions. The stitching, however, is preferably done with stainless steel wire rather than the usual cotton cord since the former will last considerably longer than the latter. Heretofore, the stitching material need have a life no longer than the fabric being stitched, and thus this material was of no particular significance. In the case of the instant improved composition, however, the stitching material itself is important and is made to last as long as the covering material itself.

A better understanding of the invention will be had by referring to the accompanying drawings setting forth an illustrative example of a preferred type of composition covering and method of applying the same.

Figure 1:
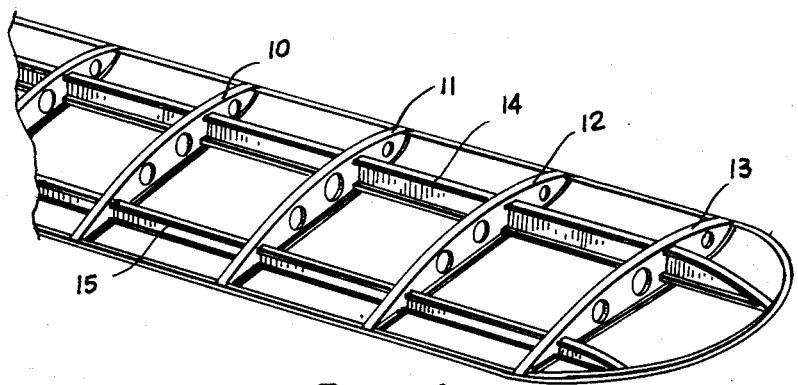
FIGURE 1 is a schematic perspective view of a portion of a frame structure such as an aircraft wing which is to be covered with the improved composition and method of the present invention.

Referring first to FIGURE 1, there is illustrated a portion of a frame structure such as an aircraft wing comprising a series of ribs 10, 11, 12, and 13 structurally held in position by suitable spars 14 and 15 all as well known in the art. The wing structure illustrated in FIGURE 1 may represent a new portion of an aircraft in a given stage of manufacture or a used aircraft from which the former conventional type fabric covering or the like has been stripped for replacement with the improved composition covering of the present invention.

Figure 2:
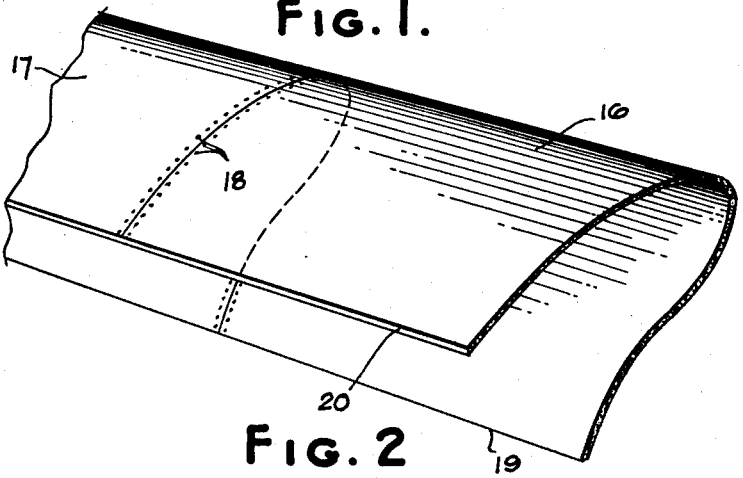
FIGURE 2 illustrates an initial layer of synthetic fiber sheet material constituting part of the improved covering composition.

Referring now to FIGURE 2, a basic layer of synthetic fibers woven into a sheet material is illustrated at 16. The synthetic fibers may comprise by way of example, any of the polyesters such as incorporated in presently available commercial material sold under the trade name of "Dacron." Alternatively, the fibers may comprise polyamides manufactured and sold under the trade name of "Nylon." Still another example are the acrylic fibers such as those marketed under the trade name of "Orlon." Essentially, the synthetic fibers have the psysical property of shrinking under the influence of heat to as much as fifty percent of their initial size. Preferably, the synthetic fibers are from the polyester group and are commercially available in woven form.

Depending upon the size and shape of the structure to be covered, various sized sheets of the synthetic woven fibers may be cut and secured together such as the sheets or layers 16 and 17 illustrated in FIGURE 2 and sewn as at 18 to provide a desired length of material. Further, the edges 19 and 20 of the sheets may similarly be sewn together to form the sheets into a desired shape such as to conform substantially to the shape of the frame structure to be covered. Thus, in FIGURE 2 by sewing together the edges 19 and 20 and closing one of the ends, a sock-like shape is provided which may be simply slid over the end of the wing structure of FIGURE 1.

Figure 3:
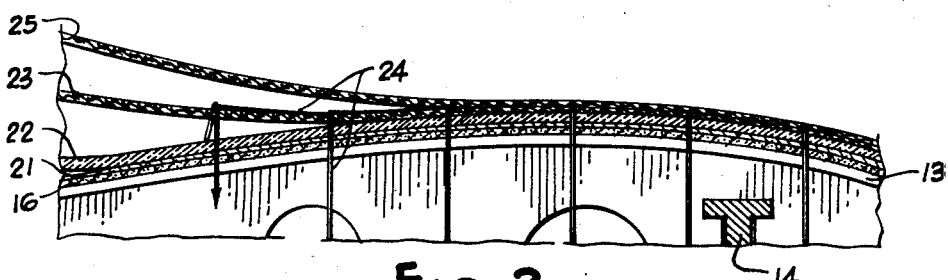
FIGURE 3 is an exaggerated diagrammatic cross sectional view to illustrate the various materials forming the improved covering composition and certain of the method steps in securing the same to a frame structure; and, FIGURE 4 is a fragmentary perspective view illustrating a preferred manner of threading stitching wire to a frame portion for securing the improved covering composition in place.

Referring now to the enlarged fragmentary cross sectional view of FIGURE 3, it will be noted that the complete composite covering includes the basic layer or sheet of synthetic fiber material 16, a suitable resin adhesive 21 such as conventional aircraft dope, and an overlying cloth material of glass fibers 22. The resin adhesive 21 thoroughly impregnates both the glass cloth and synthetic fiber layer to bond them together. While there are many different types of resins and dopes available, the preferred resin material comprises a mixture of epoxy-resin, flexibilizing agents such as polysulfide polymer, urea formaldehyde resin, organic amine, fillers such as titanium dioxide, and aluminum pigment, together with suitable thixitroping agents, diluents and solvents as required.

The covering composition as described thus far exhibits all of the improved physical properties such as greater tension strength and greater fire and tear resistance compared to conventional fabrics, and is approximately ten percent lighter than conventional fabric covering.

To secure the covering in place, suitable reinforcing tape 23 and stainless steel stitching wire 24 may be employed as shown in FIGURE 3. A final covering tape 25 may also be included over the stitched area to insure a smooth surface.

The method of forming and applying the improved covering composition on the frame structure will now be described in detail. Initially, the synthetic material such as polyester woven fibers, is sewn together into the desired shape as described heretofore in connection with FIGURE 2. It is preferable that a thread composed of material such as "Nylon" or "Dacron" be used and that the stitching 18 be spaced a minimum of one-quarter inch in from all marginal edges of the material. After the desired shape has been sewn, it may be desirable to cover the stitching with dope to prevent excessive weave separation. The entire shaped material is then worked over the frame and may temporarily be held in position on the frame as by conventional nitro-cellulose cement, staples, or any other suitable means.

In the next step of the method, the material 16, 17, is heated preferably by means of a large blast of hot air. It is also possible, however, to employ a bank of infra-red lamps, hot irons, or even to place the entire structure in an oven. The heating temperature will depend somewhat on the particular synthetic fiber material employed but usually will be of the order of 200° F. to 500° F. and preferably between 350° F. and 450° F. There is no particular length of time during which the heat is applied. It need only be applied to the various areas of the sheet until a temperature within the above noted ranges is achieved with the result that the synthetic fibers will shrink down to a smaller size causing the covering to become extremely taut and smooth and to hug the frame structure. In other words, the shrinkage property will insure that all wrinkles and the like will be removed. It will be immediately evident that as a consequence of employing an initial layer of covering material of the properties described, the actual labor in forming this layer on the frame is greatly facilitated and will result in the desired taut and smooth surface mandatory in aircraft covering operations.

After the heating and resulting shrinkage step, the entire layer may then be coated with the resin adhesive described heretofore. Alternatively, it is possible to apply the layer of glass cloth 22 first and then impregnate both the glass cloth and synthetic fiber layer by coating the glass cloth and relying on the impregnation of the resin through the glass cloth pores to impregnate the synthetic fibers. In applying the glass cloth, it may be simply laid over the synthetic fiber layer in sections, adjacent sections being overlapped an inch or so. It is also possible to apply the glass fibers and resin simultaneously from a spray gun. To apply the resin adhesive or dope, a spray gun may be used or alternatively it may be painted or rolled on with rollers or blades.

After the dope has been applied and the glass cloth sections laid over the initial layer, the glass cloth may be pressed or rolled with a roller to insure proper impregnation by the resin material.

The next step after application of the glass cloth is to lay down the reinforcing tapes 23 preparatory to the rib stitching operation. Usually glass fiber filament tape approximately one-half to one inch wide depending upon the width of the ribs, is used. The tape is first disposed over the portions of the covering in direct contact with structural portions of the aircraft such as the top surface of the rib 13 of FIGURE 3 and the stainless steel wire 24 is then employed for the stitching. Such wire has extreme strength and longevity as compared to the usual cotton or wool cords used heretofore and this use of wire is desirable since it is important that the stitching material itself last as long as the improved covering.

Figure 4:
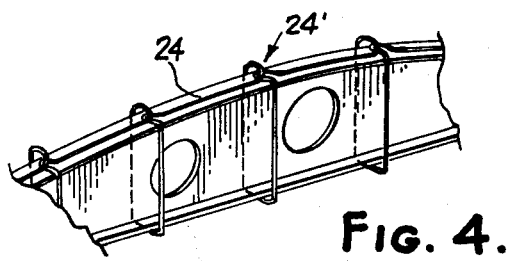

FIGURE 4 illustrates in perspective view the manner in which a single strand of wire may be employed to stitch the covering to one entire rib surface. As shown, the wire 24 passes down through the material about the lower edge of the rib and back up the other side of the rib to loop through the initial portion of the wire, as at 24', and then continues in a similar pattern throughout the length of the rib surface. In FIGURE 4, the reinforcing tape as well as the covering has been omitted for purposes of clarity.

After the stitching step, further dope or resin may be coated over the stitched portions to insure added strength and bonding of the stitching wire itself directly to the layers. Finally, the covering strip 25 may be applied, if desired, to provide the desired smooth exterior finish. As in the other dope coating operations, a simple roller or brush may be used for applying the resin to the stitched areas.

At points where inspection openings are to be cut as in the case of aircraft coverings, an additional layer of glass cloth may be positioned over such point and arranged to extend approximately one inch beyond the marginal edges of the contemplated opening. By this arrangement, a reinforced edge around the opening will be insured.

In the foregoing specification and in the following claims the words "fiber" or "fibers" are to be interpreted broadly as covering not only extremely short or chopped strands or fibers, but also continuous filament type strands.

While the composition covering and method have been described particularly with the application of covering aircraft frames in mind, it will be immediately apparent that several of the method steps as well as portions of the complete composition will be applicable to many other operations. The improved covering composition and method are, therefore, not to be thought of as limited to the specific application set forth for illustrative purposes.

What is claimed is:

1. A method of covering portions of an aircraft frame comprising the steps of: sewing together sheets of polyester fibers to form a desired shape adapted to receive a portion of said frame; applying heat to said sheets after they have been positioned to cover said portion of said frame to shrink said sheets tightly over said portion of said frame; impregnating said sheets with a resin adhesive material; and overlying said sheets with cloth formed of woven glass fibers so that said cloth is thoroughly impregnated with said resin adhesive material.

2. The method of claim 1 including the additional steps of: laying reinforcing tape over portions of said cloth and sheets in direct engagement with structural components of said frame; and stitching through said reinforcing tape, cloth, and sheets with stainless steel wire to secure said cloth and sheets to said frame.

3. A covering composition for an aircraft frame comprising, in combination: sheets of woven synthetic fibers positioned to cover portions of said frame, said fibers having the property of shrinking upon application of heat; woven glass fiber cloth overlying said sheets; an adhesive resin dope material impregnating said cloth and sheets to bond said cloth and sheets together; rainforcing tape overlying portions of said cloth; and stitches passing through said reinforcing tape, cloth, and sheets to secure the same to portions of said frame.

4. A method of covering portions of an aircraft frame comprising the steps of: covering a portion of said frame with sheets of woven synthetic fiber material; applying heat to said sheets after they have been positioned to cover said portion of said frame to shrink said sheets tightly over said portion of said frame; impregnating said sheets with a resin adhesive material; and overlying at least portions of said sheets with additional material so that said additional material is bonded to said resin adhesive material.

References Cited in the file of this patent

UNITED STATES PATENTS

| | | |
|---|---|---|
| 1,925,453 | Mazer | Sept. 5, 1933 |
| 2,053,048 | Robinson | Sept. 1, 1936 |
| 2,167,687 | Schmidt | Aug. 1, 1939 |
| 2,356,927 | Grossman | Aug. 29, 1944 |
| 2,417,586 | Crosley | Mar. 18, 1947 |
| 2,474,375 | Shearer et al. | June 28, 1949 |
| 2,789,958 | Fettes et al. | Apr. 23, 1957 |

FOREIGN PATENTS

| | | |
|---|---|---|
| 787,022 | Great Britain | Nov. 27, 1957 |

OTHER REFERENCES

United States Department, Civil Aeronautics Administration news release CAA–56–#57, "CAA Suggests Care in Glass Cloth Re-Covering," 2 pages, October 22, 1956.